Patented Sept. 2, 1952

2,609,359

UNITED STATES PATENT OFFICE 2,609,359

COPOLYMERS OF A POLYENE, AN ALKENE, AND AN OLEFINICALLY UNSATURATED AROMATIC HYDROCARBON

William J. Sparks, Westfield, and David W. Young, Roselle, N. J., assignors to Standard Oil Development Company, a corporation of Delaware No Drawing. Application March 21, 1946, Serial No. 656,148

12 Claims. (Cl. 260—79.5)

This invention relates to novel high molecular weight polymeric chemical products and to methods of making same. More particularly, it relates to the preparation of copolymers consisting almost entirely of aliphatic constituents but containing a very small amount of a combined cyclic modifying constituent. The invention may be typified by a copolymer of 97% of isobutylene and 3% of styrene.

U. S. Patents 2,213,423 and 2,274,749 disclose copolymers of isobutylene and styrene in a general way, and describe methods of effecting the copolymerization, i. e. at temperatures below 0° C., e. g. —10° C., —40° C., —80° C., or lower, and by the use of an active halide polymerization catalyst. These patents disclose that the proportions of the two reactants may be varied in order to produce thermoplastic copolymers having the desired hardness, melting point, plasticity, etc., and that the proportion of olefin used, e. g. isobutylene, may range from 1 to 90%. However, it is difficult or impossible to prepare such copolymers in a very high molecular weight range such as 50,000, 100,000 or above, and another difficulty is that when any such copolymers having molecular weights even as low as 10,000 are dissolved in paraffinic lubricating oils they tend to come out of solution when cooled down to temperatures of about 50° F. or lower. Furthermore, although when compounded with natural or synthetic rubber, such copolymers greatly improve the workability thereof, they generally effect a slight reduction either in tensile strength or in elongation.

It is also known that isobutylene alone can be polymerized to polymers ranging from viscous sticky fluids having a molecular weight range of 1,000 to 10,000 or 15,000, on up through a tacky plastic stage, to dry substantially non-tacky rubbery polymers having molecular weights of 150,000 and even much higher. However, such polybutenes, particularly those of very high molecular weights, do not have as good stability to sunlight and ultraviolet light as might be desired, and do not have entirely satisfactory stability against thermal or mechanical molecular weight breakdown.

It has now been found that between the pure polybutenes and the styrene-isobutylene copolymers having 5 or 10 or more per cent of combined styrene, it is possible to make novel copolymers having novel and unexpected characteristics not possessed by either of the two previously known types of polymeric materials. Thus, it is found that when about 0.5 or 1% up to about 4 or 4.5% or so of styrene is copolymerized with isobutylene, the resultant copolymers have surprisingly better thermal stability than polybutene, and it is believed that the small amount of styrene combined in the copolymer molecule acts somewhat like an anti-oxidant in preventing depolymerization or molecular weight breakdown at elevated temperature, which is thought to be at least partly due to or at least accelerated by incipient oxidation, because known oxidation inhibitors such as certain alkyl phenols tend to reduce the thermal decomposition of high molecular weight polybutenes.

These new copolymers may be milled into natural rubber or synthetic rubbers such as GR–S (butadiene-styrene), GR–A (butadiene-acrylonitrile), and GR–I (isobutylene-isoprene copolymer of low unsaturation), as well as other types such as neoprene, and organic polysulfide rubbers, at hot mill temperatures such as 150–330° F., with less undesirable breakdown than can polybutene of similar molecular weight.

These new copolymers having less than 5% of combined styrene or equivalent cyclic constituent, may be made in a wide range of molecular weights, according to the temperature of copolymerization used and the particular type of catalyst used. However, the invention is applied to particular advantages by effecting the copolymerization at temperatures below —50° C. so the resulting copolymers will have a molecular weight of at least 30,000 and preferably at least 50,000. With previously used high percentages of styrene in the copolymer it has been difficult or impossible to obtain products having molecular weights higher than about 30,000 or 40,000. For instance, if a mixture of 40% of styrene and 60% of isobutylene is copolymerized at —103° C. in methyl chloride solution and using as catalyst a solution of aluminum chloride dissolved in methyl chloride, the resulting copolymer will have a molecular weight of about 25,000, and if the proportion of reactants is reversed so as to use 60% of styrene in the feed, the copolymer will have only 18,000 to 20,000 mol. wt., whereas under similar copolymerization conditions copolymers having less than 5% of combined styrene are made having molecular weights ranging from about 70,000 up to 200,000. These new copolymers when made in the very high molecular weight range such as 150,000 to 200,000 or higher are dry, rubbery products having no cold flow. They resemble polybutene in general physical texture and appearance except that for any particular molecular weight they have a physical texture corresponding more closely to a polybutene having a molecular weight about 25% higher.

Another remarkable characteristic of these new copolymers is that they have quite gradual heat-softening characteristics much more resembling pure polybutene than the more sharply thermoplastic type of heat-softening properties of styrene-isobutylene copolymers having larger amounts of combined styrene.

The copolymers of this invention also have an unexpectedly good combination of good solubility in paraffinic lubricating oils even at very low temperatures, e. g. 0° F., and good stability under shear tests. An indication that the combined styrene content of these new copolymers is critically important even though small in quantity, is that these copolymers are found to dissolve in benzene to form a clear solution at 20° C. whereas polybutenes of similar molecular weight do not. Another characteristic which may be particularly valuable under certain circumstances, is that the copolymers of this invention generally have a much narrower molecular weight spread than isobutylene polymers made under similar polymerization conditions of temperature, type of catalyst and solvent.

In carrying out the copolymerization, the catalyst to be used may be aluminum chloride, boron fluoride, or activated boron fluoride containing 0.1% of ether, titanium tetrachloride, aluminum alkoxide-aluminum chloride complex $$(AlCl_3.Al[OC_2H_5]_3)$$

$AlBr_3$, $AlBr_3.Al(OC_2H_5)_3$, $(AlBr_3)_4.AlOBr$ and the like. If desired, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane or propane, at or below the boiling point of the catalyst solvent, and then the catalyst solution cooled down, filtered and added to the reaction mixture. Alternative catalysts include: 
$AlBr_3.Br_2.CS_2$ $AlBr_3.Br_4.CS_2$, $BF_3$-isopropyl alcohol complex, $BF_3$ solution in ethylene, activated $BF_3$ catalyst in ethylene solution.

The copolymerization is preferably carried out in the presence of a volatile solvent or diluent or refrigerant, such as propane, ethane, ethylene, methyl chloride, carbon dioxide (liquid or solid), etc.; such materials may be used either as internal refrigerants or external refrigerants or both, to remove the liberated heat of polymerization. One advantage of the present invention is that due to the use of less than 5% of styrene or equivalent cyclic constituent, both the feed materials and resulting copolymers are sufficiently soluble in lower aliphatic hydrocarbon solvents such as propane, that it is not necessary to use a lower alkyl halide solvent such as methyl chloride as is required for copolymerizations involving higher amounts of styrene reaction.

After completion of the copolymerization, residual catalyst may be hydrolyzed by adding an alcohol, for example, isopropyl alcohol or ethyl alcohol, or water or both, and removed by washing the product with water and preferably also with dilute aqueous caustic soda. Any residual solvents or wash water or other hydrolyzing agents may be removed by heating the copolymer with or without milling, kneading or other agitation.

Instead of isobutylene as the alkene, other lower aliphatic olefins may be used, preferably iso-olefins having 4 to 8 carbon atoms such as isopentene (methyl-2 butene-1), or a normal pentene obtained by dehydration of secondary amyl alcohol, although other lower olefins such as propylene may also be used.

Instead of styrene as the polymerizable olefinic cyclic compound, other materials may be used such as alpha-methyl styrene, para-methyl styrene, alpha-para-dimethyl styrene, dihydronaphthalene, indenes, etc. Various derivatives or homologues of such compounds having one or more short alkyl groups (e. g. 1 to 10 carbon atoms) attached to the cyclic nucleus and not interfering with the polymerization, may be used.

A further modification of the invention, as already disclosed in application Serial No. 550,488 filed August 21, 1944, now abandoned, of which the present application is a continuation-in-part, is the use of a small amount of a third reactant, namely, a diolefin or other polyene having 4 to 15 carbon atoms. As such constituent, it is preferred to use isoprene, although others may be used such as butadiene; 2,3-dimethyl butadiene 1-3; 1,4-dimethyl butadiene 1,3; piperylene; cyclopentadiene; myrcene; 2-methyl 3-ethyl butadiene; hexatriene; 2-methyl-pentadiene; and alloocimene. Also, vinyl acetylene may be used instead of such polyenes.

The proportions to be used in making up the copolymerization feed stock may vary somewhat according to the intended purpose. For instance if a saturated copolymer is desired, i. e. having less than about 0.1 iodine number and being substantially free from tendencies to absorb oxygen and harden due to aliphatic unsaturation, then no polyene is used in the feed, and the polymerizable mono-olefinic hydrocarbon containing a cyclic nucleus, e. g. styrene or equivalent material, should be used in a concentration of at least 0.01% but less than 5% by weight, preferably about 0.5% to 4.5% and better still for most purposes about 1.0 to 4.0%. If no polyene is used then the aliphatic olefin such as isobutylene will constitute the remainder of the active copolymerization feed, and it will be present in a concentration greater than 95% and may be as great as 99.99%. It is found that even relatively minute amounts, much less than 1%, of styrene, when copolymerized with isobutylene, have a very beneficial effect in stabilizing the polybutene chain against depolymerization due to sunlight, ultraviolet light, heat and oxidation.

If a polyene is used such as isoprene, the amount thereof to be used will depend primarily upon the desired amount of unsaturation in the finished copolymer, and this should correspond to iodine number less than about 50 and should preferably be about 1 to 20, therefore requiring generally at least 0.1% but not more than 15%, preferably about 0.5 to 10% of polyene, although in some cases amounts as small as 0.1% may suffice. Also, when a polyene is used, the amount of styrene or equivalent polymerizable cyclic material used may be slightly higher than when no polyene is used; for instance in such tripolymers the proportion of cyclic material may be about 0.01 to 10%, preferably about 1 to 5%, and of course if a polyene is used the amount of aliphatic olefin, e. g. isobutylene, will be somewhat less than otherwise, namely, will be about 70 to 99%, preferably about 85 to 95%.

The preferred procedure for carrying out the copolymerization of this invention is to mix the isobutylene and styrene, together with the isoprene if any is used, or their equivalents, cool them down to the desired operating temperature by either external or internal refrigeration, preferably having some diluent or solvent present, for instance in a proportion of about 1 to 5 volumes of solvent per volume of mixed copolymerization feed, and then adding to that reaction mixture the desired amount of catalyst or solution thereof, preferably agitating the mixture well during the addition of the catalyst.

After hydrolysis and removal of catalyst as previously mentioned, the resultant high molecular weight copolymer may be heated if desired, with or without milling or other agitation, to remove residual traces of solvent, diluent or refrigerant or of water or alcohol left from the washing step.

The copolymer per se is a plastic, and in most case rubbery and elastic, solid having an average molecular weight above 30,000, and preferably above 50,000. Molecular weights well above 300,000 have been obtained. Copolymers having a molecular weight below 50,000 generally are somewhat tacky, while those in the vicinity of 100,000 mol. wt. are only very slightly tacky and those in the vicinity of 150,000 or 200,000 are dry and free from cold flow.

Tripolymers made according to this invention and having an iodine number ranging from about 0.1 up to about 50, preferably about 0.5 to 20, are vulcanizable and may be cured by treatments similar to those used for vulcanizing a synthetic rubber made by low temperature copolymerization of isobutylene in the presence of a small amount of a polyene of 4 to 12 carbon atoms, e. g. 1 to 3% of isoprene or 5 to 10% or so of butadiene.

For curing the tripolymer as more specifically disclosed in application Serial No. 632,102 filed November 30, 1945, now abandoned, of which the present application is also a continuation-in-part, one may use sulfur and one of the various fast accelerators or ultra-accelerators such as tetramethyl thiuram disulfide, mercaptobenzothiazole, dinitrosobenzene, quinone dioxime with an oxidizing agent such as lead peroxide or lead oxide or benzoyl peroxide, or esters and salts of quinone dioxime, as curing agents. The quantities may vary from 0.3 to 6 parts by weight of resin, the 6 parts being used in the case of the esters and 0.3 for quinone dioxime or para dinitrosobenzene. Temperatures of curing may be from room temperature to 400° F. Time of cure may vary from 10 seconds (at high temperature) to possibly several days or a week at room temperature.

The isobutylene-styrene type copolymer even without any polyene, can be cured through the presence of the benzene ring by reagents such as formaldehyde, or acetyl peroxide, heptoyl peroxide, etc.

The two-component copolymers, not containing any polyene, are claimed in co-pending application Serial No. 176,256, filed July 27, 1950.

The tripolymers of this invention are particularly valuable for the preparation of so-called pure gum stocks or white or light colored synthetic rubber stocks, because the presence of the small proportion of combined styrene greatly stabilizes the tripolymer against deterioration due to sunlight and/or heat, against which stabilization has often heretofore been obtained by compounding a large amount of carbon black into the stock before curing.

The copolymers of this invention may be used for a wide variety of purposes in addition to those mentioned above. For instance they may be used for coating metal, wood, paper, cloth, glass, and for laminating various thin flexible sheet material such as paper cloth, metal foil, regenerated cellulose, cellulose acetate etc., and for such purposes the copolymers may be dissolved in a volatile solvent such as naphtha, and applied by various conventional methods such as dipping, spraying, roll coating, etc., followed by evaporation of the solvent, or the copolymers may be compounded with softening or plasticizing materials such as mineral oils, waxes, e. g. paraffin wax or petrolatum, asphalt or thermoplastic compatible resins preferably of the hydrocarbon type, and when thus softened or plasticized, may be used in molten or heat-softened condition for any of the purposes above mentioned.

These products also are particularly well adapted for electrical insulation purposes, particularly for dielectric medium, alone or together with paraffin wax, in electrical condensers.

These products may also be compounded with other types of high molecular weight polymeric materials, preferably those of a predominately aliphatic nature such as polybutene, polyethylene and other polymerized olefins, as well as synthetic rubber of the GR-I type, e. g. made by low temperature Friedel-Crafts polymerization of isobutylene with about 1 to 3% of isoprene, although they may also be compounded with natural rubber and other types of synthetic rubber such as those made by emulsion polymerization of butadiene alone or in together with a minor proportion of styrene or acrylonitrile.

The copolymers of this invention, whether made with polyene or not, are miscible with molten paraffin wax in all proportions, and therein differ greatly from styrene-isobutylene copolymers having a higher styrene content, e. g. 10 to 60% or so.

These copolymers having less than 5% of styrene or other cyclic constituent can also be used as viscosity index improvers in lubricating oils, diesel fuels or even gasoline.

Another valuable characteristic of this invention is that these new copolymers lend themselves very peculiarly to the formation of many new chemical derivatives because the very small proportion of styrene or other cyclic constituent combined into the copolymer makes these products susceptible to reaction with strong acids such as sulfuric acid, nitric acid, as well as to other chemical agents such as halogenation, oxidation, sulfurization, treatment with phosphorus sulfides, e. g. $P_2S_5$, alkylation, e. g. with amyl chloride, acylation, e. g. by acetyl chloride, sebacyl chloride, phthalyl chloride, as well as other interlinking resinifying agents, e. g. formaldehyde, ethylene dichloride, chlorinated paraffin wax, etc.

The invention will be better understood from a consideration of the following experimental data.

EXAMPLE 1

A copolymerization feed was formulated from 97% by weight of isobutylene and 3% of styrene. To this mixed feed, powdered solid carbon dioxide was added to cool the mixture to −78° C.

and then boron fluoride gas was bubbled slowly into the mixture with stirring. Copolymer formed at a very rapid rate. The product had a molecular weight of about 33,000 and the yield was about 47%. The copolymer was soluble in benzene at temperatures as low as 20° C., whereas polybutene of the same molecular weight came out of solution at 20° C.

EXAMPLE 2

A copolymerization feed was formulated from 95% by weight of isobutylene, 3% of styrene and 2% of 1,3-butadiene. About 3 volumes of liquid ethane were added, to serve both as internal refrigerant and as diluent. When the mixture was cold, about −90° C., $BF_3$ gas was added as catalyst. The copolymerization reaction was rather slow and resulted in a copolymer of relatively low molecular weight, e. g. about 18,000. This copolymer was soluble in benzene at +20° C. It had an iodine number of about 1.

EXAMPLE 3

Four tests were made to compare the effect of a small amount (e. g. 5%) of styrene on the curing properties of a GR-I type of synthetic rubber made by copolymerizing 97% by weight of isobutylene with 3% by weight of a diolefin. In the first two tests, the diolefin used was 2,3-dimethyl butadiene-1,3 and the catalyst was $BF_3$, and in the third and fourth tests, the diolefin used was isoprene and the catalyst was $TiCl_4$. In all four tests ethylene was used as refrigerant, the volume ratio of ethylene per volume of polymerization feed being indicated in the following table, together with the mol per cent unsaturation and the Staudinger mol. wt. of the resulting copolymers, and the physical tests including tensile strength, modulus and elongation, on the copolymers after vulcanization for 20 and 40 mins. respectively at 307° F., when compounded with 50 parts by weight of Cabot #9 carbon black, per 100 parts by weight of copolymer, using 2% by weight of sulfur and 1% by weight of Tuads (tetramethyl thiuram disulfide) and ½% Captax (mercapto-benzothiazole) as vulcanization accelerator.

*Table I*

| Test No. | Vol. Oil Ratio | Additives | Catalyst | Mol. Percent Unsat. | Staud. M. Wt. | 50 Parts Cabot #9 Cures at 307° F. | | | | | |
|---|---|---|---|---|---|---|---|---|---|---|---|
| | | | | | | 20 min. | | | 40 min. | | |
| | | | | | | T. | Mod. | Elong. | T. | Mod. | Elong. |
| 1.[1] | 4/1 |  | $BF_3$ |  | 68,000 | 3,130 | 250 | 900 | 3,260 | 380 | 830 |
| 2.[1] | 4/1 | 5% Styrene | $BF_3$ | 1.8 | 56,000 | 2,650 | 290 | 900 | 2,870 | 440 | 900 |
| 3.[2] | 3/1 |  | $TiCl_4$ | 2.0 | 62,000 | 2,970 | 480 | 780 | 2,960 | 740 | 670 |
| 4.[2] | 3/1 | 5% Styrene | $TiCl_4$ | 2.0 | 43,000 | 2,880 | 505 | 850 | 2,970 | 810 | 720 |

[1] 3% 2.3 dimethyl butadiene 1-3. [2] 3% isoprene.

These data show that the 5% of styrene used in tests 2 and 4 effected a substantial increase in the modulus (tensile strength at 300% elongation) without seriously reducing the ultimate tensile strength at break. This 5% of styrene has the additional advantage of greatly reducing the susceptibility of such cured copolymers to deterioration due to sunlight, heat and oxidation.

EXAMPLE 4

A copolymer was prepared from an olefinic feed containing 98% by weight of isobutylene and 2% by weight of styrene, this mixture being copolymerized at a temperature of −101° C. in the presence of 3 volumes of methyl chloride as solvent per volume of polymerizable feed, and using as catalyst $AlCl_3$ in methyl chloride (0.6 g./100 ml.). The resulting copolymer had an average mol. wt. of about 100,000, by Staudinger method, and was a substantially tack-free, flexible, substantially colorless rubbery solid. 20 parts by weight of this copolymer were compounded with 80 parts by weight of natural rubber smoked sheet and other compounding and curing ingredients as listed here below and then cured at 285–287° F. For comparison a composition identical except for the omission of the isobutylene-styrene copolymer, was similarly compounded and cured. The abrasion resistance and flex-resistance of the resulting products after curing for various periods from 5 mins. to 20 mins. are also shown here below.

*Table II*

| Recipe No. | 1 | 2 |
|---|---|---|
| Ingredients: | | |
| Smoked sheet | 100 | 80 |
| Carbon black | 50 | 50 |
| Pine tar | 4 | 4 |
| Antioxidant [1] | 1 | 1 |
| Zinc oxide | 5 | 5 |
| Stearic acid | 3.5 | 3.5 |
| Accelerator [2] | 0.8 | 0.8 |
| D. P. G. (diphenylguanidine) | 0.2 | 0.2 |
| Sulfur | 3 | 3 |
| Copolymer [3] | | 20 |
| Abrasion Resistance (ASTM D394-40) | | |
| Mins. cure at 285–287° F.: | | |
| 5 | 241 | 319 |
| 10 | 193 | 219 |
| 15 | 161 | 197 |
| 20 | 192 | 196 |
| Flex Resistance to #10 cracking (modif. of ASTM D813-44T) | | |
| Mins. cure at 285° F.: | | |
| 5 | 175,000 | 300,000 |
| 10 | 400,000 | 680,000 |
| 15 | 100,000 | 780,000 |
| 20 | 75,000 | 425,000 |

[1] A mixture of about 65% of a complex diaryl amine ketone aldehyde reaction product with about 35% of NN'diphenyl p-phenylene diamine.
[2] mercapto-benzothiazole.
[3] isobutylene-styrene copolymer of 100,000 mol. wt. and containing 2% combined styrene.

The above data show that the incorporation of 20% of the 2% styrene type copolymer of isobutylene and styrene effected a slight increase in the abrasion resistance of the compounded cured rubber, and effected a tremendous improvement in its flex resistance.

EXAMPLE 5

Styrene is soluble in a mixture of 1 volume of isobutylene and 3 volumes of liquid ethane, to the extent of about 3% by weight. A series of tests were made in which a mixture of 2.5% by weight of styrene and 97.5% by weight of isobutylene was copolymerized in the presence of 3 volumes of liquid ethane per volume of liquid copolymerization feed, using gaseous $BF_3$ as catalyst, either alone or together with 0.1% of ether (diethyl ether) as accelerator. The molecular weights of the resulting copolymers are shown in the following table:

*Table III*

| Test No. | Accelerator | Mol. Weight |
|---|---|---|
| 1 | None | 10,680 |
| 2 | None | 13,350 |
| Aver. | | 12,015 |
| 3 | 0.1% Ether | 35,190 |
| 4 | 0.1% Ether | 44,500 |
| 5 | 0.1% Ether | 36,140 |
| 6 | 0.1% Ether | 50,230 |
| Aver. | | 41,515 |

The above Table III shows that when gaseous boron fluoride alone is used as catalyst for copolymerizing isobutylene containing about 2.5% by weight of styrene, the resulting copolymer has a molecular weight only about 10,000 to 15,000, whereas when the $BF_3$ is supplemented by the use of 0.1% of ether as accelerator, the molecular weight of the resulting copolymer ranges from about 35,000 to 50,000. This is a surprisingly good result considering that the copolymerization was carried out in the presence of only a hydrocarbon material, namely ethane, as solvent and refrigerant, because styrene has such a low solubility in aliphatic hydrocarbons at low temperature that generally a halogenated hydrocarbon liquid such as methyl chloride has been used heretofore in copolymerizing styrene-isobutylene mixtures containing higher amounts of styrene, e. g. 20 to 60% or so.

EXAMPLE 6

Another series of tests was made to determine the optimum amounts of $BF_3$ catalyst and butane diluent, for copolymerizing 1% by weight of styrene with 99% of isobutylene using 0.01% of ethyl ether to activate the $BF_3$ catalyst and using solidified carbon dioxide as internal refrigerant, which therefore maintains a copolymerization temperature of about $-78°$ C. The conditions of polymerization used in each test, and the molecular weight of the resulting copolymer are given in the following Table IV.

*Table IV*

[Solid $CO_2$ refrigerant—0.1% ethyl ether added to olefin feed. Active feed—99% isobutylene-1% styrene.]

| Percent Butane Diluent | Percent $BF_3$ Catalyst | Staudinger Mol. Wt. |
|---|---|---|
| 0 | 1 | 92,000 |
| 10 | 1 | 105,000 |
| 20 | 1 | 115,000 |
| 40 | 1 | 112,000 |
| 60 | 1 | 98,000 |
| 80 | 1 | 75,000 |
| 0 | 3 | 95,000 |
| 10 | 3 | 120,000 |
| 20 | 3 | 132,000 |
| 40 | 3 | 120,000 |
| 60 | 3 | 98,000 |
| 80 | 3 | 75,000 |

The above data in Table IV shows that when 0.1% ether activator is used, copolymers ranging from 75,000 to about 95,000 mol. wt. are obtained with 1 to 3% of $BF_3$ catalyst and without any butane diluent, but copolymers having higher molecular weights in the range of 100,000 to 130,000 are obtained with similar concentrations of $BF_3$ but with 10 to 50% by weight of butane diluent.

EXAMPLE 7

Another series of tests similar to those in Example 6 in regard to the copolymerization of 1% of styrene with 99% of isobutylene, was made to determine the optimum amount of ether activator for the $BF_3$ catalyst. These tests were carried out using ethane as refrigerant but no heavier material such as butane as diluent. The use of ethane as an internal refrigerant maintained a copolymerization temperature of about $-89°$ C. The various proportions of ether activator used, ranging from 0 to 0.4% by weight based on the weight of polymerization feed, and the amounts of $BF_3$ used ranging from 1 to 3%, and the molecular weights of the resulting copolymers are shown in the following table:

*Table V*

[Polymerization of 99% isobutylene—1% styrene feed with $BF_3$ activated catalyst. Ethane Refrigerant (3 vol. ethane per vol. active feed).]

| Staudinger Mol. Weight | Percent $BF_3$ | Percent Ethyl ether in feed |
|---|---|---|
| 110,000 | 1 | 0.1 |
| 140,000 | 1 | 0.2 |
| 165,000 | 1 | 0.3 |
| 145,000 | 1 | 0.4 |
| 111,000 | 2 | 0.1 |
| 160,000 | 2 | 0.2 |
| 197,000 | 2 | 0.3 |
| 140,000 | 2 | 0.4 |
| 170,000 | 3 | 0.1 |
| 220,000 | 3 | 0.2 |
| 250,000 | 3 | 0.3 |
| 190,000 | 3 | 0.4 |

The above data in Table V shows that when 1% of styrene is copolymerized with 99% of isobutylene using ethane refrigerant at $-89°$ C. and using 0.1 to 0.4% of ether activator for the $BF_3$ catalyst, copolymers of highest molecular weight were obtained with 0.3% of ether activator, and with this concentration of activator, 1% of $BF_3$ gave a copolymer of 165,000 mol. wt., 2% of $BF_3$ gave 197,000 and 3% gave 250,000. Using 3% of $BF_3$ but no ether activator the molecular weight obtained was only 58,000. Also it may be noted that the 1% styrene type copolymerization is more sensitive to catalyst activation by ether than are copolymerizations using higher amounts of styrene, such as 20%.

EXAMPLE 8

Copolymers having about 2% of combined styrene and 98% isobutylene, were made having two different average molecular weight ranges, one about 12,000 and the other about 78,000. These copolymers were then blended in several concentrations up to 40% by weight in a paraffin wax having a melting point of about 135° F. All of these blends were completely homogeneous even at temperatures well above the melting point of the wax, showing good solubility of the copolymers of such low styrene content in molten paraffin wax. The refractive index of each of these blends was determined at 60° C. and the data were summarized as follows:

| Mol. wt. of copolymer | Refr. Index of Blends (at 60° C.) | |
|---|---|---|
| | 12,000 | 78,000 |
| Percent Copolymer in wax: | | |
| 0 | 1.4370 | 1.4370 |
| 10 | 1.4421 | 1.4425 |
| 20 | 1.4490 | 1.4491 |
| 40 | 1.4612 | 1.4600 |

EXAMPLE 9

A series of tests was made to show the effect of various amounts, less than 5%, of styrene in the copolymerization with isobutylene, at $-103°$ C., using 2 volumes of methyl chloride as solvent per volume of active olefin feed, and using as catalyst a solution of 0.28 gram of $AlCl_3$ in methyl chloride. The molecular weights of the copolymers obtained, in comparison with plain polybutene made under similar conditions, are shown in the following table:

| Sample No. | Percent styrene in feed | Mol. weight of polymeric product (Staudinger method) |
|---|---|---|
| 1 | 0 | 221,000 |
| 2 | 1 | 138,000 |
| 3 | 3 | 118,000 |
| 4 | 4 | 86,000 |
| 5 | 4.5 | 77,000 |

The above data show that when 1% of styrene is copolymerized with isobutylene the molecular weight of the product is lowered about 40% but larger amounts of styrene up to 4 or 4.5% only make relatively small further reductions in the molecular weight of the resulting copolymers. On the other hand, the presence of the 1 to 4% or so of styrene in the copolymer effects a great improvement in the stability of the copolymer against molecular weight breakdown when subjected either to mechanical shear, elevated temperature or oxygen.

For instance, the following mill stability tests show that the above described copolymers having from 1 to 4.5% of combined styrene suffer much lower breakdown in molecular weight than a polybutene made under the same polymerization conditions. In this series of tests in which the polymer was milled on a pair of steel rolls such as commonly used for hot milling rubber, the mill clearance used was 0.015 inch and the mill temperature was 305° F. Samples were taken every 10 mins. up to 1 hour.

Mill stability tests
MOLECULAR WEIGHTS AT DIFFERENT MILLING TIMES

| Percent styrene in feed | Minutes | | | | | | |
|---|---|---|---|---|---|---|---|
| | 0 | 10 | 20 | 30 | 40 | 50 | 60 |
| 0 | 221,000 | 138,000 | 100,000 | 85,500 | 56,880 | 32,790 | 25,207 |
| 1 | 138,000 | 102,780 | 97,895 | 63,450 | 60,000 | 40,000 | 39,000 |
| 3 | 118,000 | 102,000 | 97,000 | 63,000 | 40,000 | 38,000 | 39,000 |
| 4 | 86,230 | 86,000 | 86,000 | 82,400 | 82,400 | 82,100 | 51,930 |
| 4.5 | 77,000 | 74,000 | 70,000 | 68,000 | 60,080 | 59,000 | 58,200 |

The above data show that the plain polybutene broke down from a molecular weight of 221,000 to about 25,000 and thus retained only 11.4% of the original molecular weight, whereas the copolymer with even as little as 1% of styrene broke down from 138,000 to only 39,000, thereby retaining 28.2% of its original molecular weight. This is a 247% improvement as compared to the 11.4% molecular weight retention of the plain polybutene. Making similar calculations for the other data in the above table, the relative improvements are tabulated as follows:

| Percent styrene in feed | Percent Mol. Wt. retained | Percent improvement over polybutene | Percent improvement over polybutene, for each 1% styrene in copolymer |
|---|---|---|---|
| 0 | 11.4 | | |
| 1 | 28.2 | 247 | 247 |
| 3 | 33.0 | 290 | 97 |
| 4 | 60.5 | 531 | 133 |
| 4.5 | 75.5 | 662 | 147 |

These calculations on the relative improvements indicate that the greatest proportionate improvement is obtained with the first per cent of styrene, and that although subsequent further additions of styrene in the polymerization feed effect further improvements in the molecular weight retention during milling, such subsequent additions of styrene are relatively less effective when compared on the basis of the amount of styrene used. It is also significant that as little as 4.5% of styrene in the feed produces about 75% mol. wt. retention, so that obviously much larger amounts of styrene such as 20% or 50% could not possibly effect a much greater improvement in mol. wt. retention than is obtained with this still relatively minute amount of 4.5%.

EXAMPLE 10

Three tripolymers were made having low unsaturation and low combined cyclic constituent, by copolymerizing 95 or 96% of isobutylene with 1 to 3% of styrene and 2 to 4% of isoprene, using 2 volumes of methyl chloride as solvent per volume of active feed, and using liquid ethylene as internal refrigerant to maintain a polymerization temperature of about $-103°$ C., and using as catalyst about 20 by weight (based on the active feed) of a 0.4% solution of $AlCl_3$ in methyl chloride.

The resulting tripolymers were tested for molecular weight and were then vulcanized using the following curing formula and using a 20 min. cure at 307° F.:

| | Parts by weight |
|---|---|
| Tripolymer | 100 |
| Carbon black | 50 |
| Zinc stearate | 1 |
| Sulfur | 2 |
| Tetramethyl thiuram disulfide | 1 |
| Mercapto-benzothiazole | 0.5 |

The composition of the copolymerization feed, molecular weight, and physical tests on the cured products were as follows:

*Table VI*

| Test No. | 1 | 2 | 3 |
|---|---|---|---|
| Copolymerization active feed: | | | |
| styrene | 1 | 2 | 3 |
| isobutylene | 95 | 96 | 95 |
| isoprene | 4 | 2 | 2 |
| Total | 100 | 100 | 100 |
| Product: | | | |
| mol. wt. (Staudinger) | 44,000 | 52,000 | 43,000 |
| tensile (lbs./sq. in.) | 2,420 | 2,640 | 2,100 |
| modulus (at 300%) | 250 | 530 | 490 |
| Percent elong. (to break) | 910 | 875 | 900 |
| mole percent unsaturation | 2.3 | 1.4 | 1.7 |

EXAMPLE 11

4.5% by weight of styrene was copolymerized with 95.5% of isobutylene at −101.3° C., using 2 volumes of methyl chloride as solvent per volume of active olefin feed, and using as catalyst $AlCl_3$ in $CH_3Cl$ solution. The yield of the copolymer was 64% (dry weight) and its molecular weight was 82,000 (by Staudinger method). This copolymer had a Williams plasticity of 207 and a recovery of 87. It also had a tensile strength of 58 lbs./sq. in. and an elongation of 1725%. These characteristics indicate that this copolymer more nearly resembles the high molecular weight elastic or rubbery polybutenes (e. g. having a molecular weight of 150,000 or so) than the resinous or plastic styrene-isobutylene copolymers which contain 30 or 50% or so of styrene, but compared to polybutene this copolymer containing 4.5% of styrene has much better stability against mechanical breakdown, heat and sunlight.

EXAMPLE 12

4.0% by weight of α methyl p-methyl styrene was copolymerized with 96% of isobutylene at −101.3° C., using 2 volumes of methyl chloride as solvent per volume of active olefin feed and using as catalyst $AlBr_3$ in $CH_3Cl$ solution (1% solution). The yield of the copolymer was 49% (dry wt.) and its molecular weight was 69,000 (Staudinger). This copolymer had a tensile of 50 lbs./sq. in. and an elongation of 1840%. The polymer was soluble in diisobutylene, benzene, and toluene.

EXAMPLE 13

2.0% by weight of α methyl p-methyl styrene was copolymerized with 95% of isobutylene and 3% of 2-3 dimethyl butadiene 1-3 at −101.3° C., using 2 volumes of ethyl chloride as solvent per volume of active olefin feed and using as catalyst $TiCl_4$ in $CH_3Cl$. The concentration of $TiCl_4$ in $CH_3Cl$ was 2% by weight. About 20% by volume (to active olefin) of catalyst solution was used. Yield of tripolymer (dry wt.) was 82%. Staudinger mol. wt. of tripolymer was 38,000. Iodine No. of polymer was 3. The tripolymer was soluble in benzene, di-isobutylene, and toluene.

EXAMPLE 14

A mixture of 10% of mono-vinyl acetylene and 5% of styrene and 85% of isobutylene by weight is placed in a Dewar chamber which has been fitted with an agitator. The mixture was cooled by adding some solid carbon dioxide and then was blown with dry nitrogen as an internal refrigerant till the mixture was cooled to about −100° C., and maintained thus during the reaction. While stirring the reaction mixture vigorously, about 1% of boron trifluoride in the form of a solution of 8% of boron trifluoride in methyl chloride was added at a rate of 20 cc. per minute. A vigorous exothermic reaction took place producing a tacky solid which had a Staudinger mol. wt. of about 38,000, and an iodine No. of 6.7, which indicated that about 8% mono-vinyl acetylene had combined into the copolymer. The reaction was killed with alcohol and the polymer was washed with water and dried. Yield of dry polymer was 83% by weight. The polymer was compounded and vulcanized using the following formula:

| | Parts |
|---|---|
| Polymer | 100 |
| Mercapto-benzothiazole | ½ |
| Stearic acid | 3 |
| Zinc dibutyl dithiocarbamate | 1 |
| Zinc oxide | 10 |
| Carbon black | 25 |
| Sulfur | 3 |

This stock upon heating at 150° C. for 30 min. gives a product which has a tensile strength of 1,800 lbs./sq. in. and an elongation of 998% to break.

It is not intended that this invention be limited to the specific materials which have been mentioned merely for the sake of illustration but only by the appended claims in which it is intended to claim all novelty inherent in the invention as well as all modifications coming within the scope and spirit of the invention.

We claim:

1. Process according to claim 12 using 90 to 98% of isobutylene, 1 to 5% of styrene and about 0.5 to 5% of isoprene.

2. Process according to claim 12 carried out at a temperature of about −103° C. using liquid ethylene as refrigerant, and using as catalyst a solution of aluminum chloride in methyl chloride, and the reaction being carried out in the presence of about 2 volumes of methyl chloride as inert solvent per volume of mixed reactants.

3. The process which comprises preparing a vulcanizable rubbery tripolymer according to claim 12, and then curing the resultant tripolymer with a small amount of sulfur in the presence of a vulcanization accelerator.

4. Product comprising essentially a vulcanizable rubbery tripolymer of about 90 to 98% by weight of isobutylene, about 1 to 5% of styrene and about 0.5 to 5% of isoprene, said tripolymer having an average molecular weight of at least 30,000 and having an I No. of about 0.5 to 20.

5. Product consisting essentially of a sulfur-cured tripolymer of about 90 to 98% by weight of isobutylene, about 1 to 5% of styrene and about 0.5 to 5% of isoprene, said tripolymer having before curing an average molecular weight of at least 30,000 and an I No. of about 0.5 to 20, and said cured tripolymer having a reduced I No. and a higher tensile strength and modulus.

6. A vulcanized tripolymer of at least about 80% by weight of isobutylene, about .01 to 5% of a styrene, and about 0.1 to 15% of mono-vinyl acetylene.

7. A product consisting essentially of a tripolymer of 95% by weight of isobutylene, 3% of styrene and 2% of 1,3-butadiene, said tripolymer having an average molecular weight of about 18,000 and being soluble in benzene at 20° C., and having an iodine number of about 1.

8. The process of making high molecular weight copolymers having an iodine number of 0.1 to 50, and an average molecular weight of at least about 18,000, by the Staudinger method, which comprises copolymerizing at least 80% by weight of an alkene having 3 to 8 carbon atoms, about .01 to 5% of a polymerizable monoolefinic aromatic hydrocarbon selected from the group consisting of unalkylated aromatic hydrocarbons and derivatives thereof containing at least one alkyl group of 1 to 10 carbon atoms, and about 0.1 to 15% of an unsaturated aliphatic selected from the group consisting of a polyene of 4 to 15 carbon atoms and vinyl acetylene, at a temperature below 0° C. with a Friedel-Crafts catalyst.

9. Product comprising essentially a high molecular weight tripolymer of at least 80% by weight of an alkene having 3 to 8 carbon atoms, about .01 to 5% of a polymerizable monoolefinic hydrocarbon selected from the group consisting of unalkylated aromatic hydrocarbons and derivatives thereof containing at least one alkyl group of 1 to 10 carbon atoms, and about 0.1 to 15% of an unsaturated aliphatic selected from the group consisting of a polyene of 4 to 15 carbon atoms and vinyl acetylene, said tripolymer having an iodine number of about 0.1 to 50 and an average molecular weight of at least about 18,000, by the Staudinger method.

10. A vulcanized tripolymer of at least 80% by weight of an alkene having 3 to 8 carbon atoms, about .01 to 5% of a polymerizable monoolefinic hydrocarbon selected from the group consisting of unalkylated aromatic hydrocarbons and derivatives thereof containing at least one alkyl group of 1 to 10 carbon atoms, and about 0.1 to 15% of an unsaturated aliphatic selected from the group consisting of a polyene of 4 to 15 carbon atoms and vinyl acetylene, said tripolymer having had before vulcanization a molecular weight of at least about 18,000, by the Staudinger method.

11. A vulcanized tripolymer of about 90 to 98% by weight of isobutylene, about 0.5 to 5% of an aromatic hydrocarbon selected from the group consisting of polymerizable monoolefinic aromatic hydrocarbons having 1 to 2 rings, and derivatives thereof containing 1 to 2 methyl groups, and about 0.5 to 5% of a conjugated aliphatic diolefin of 4 to 6 carbon atoms, said tripolymer having had before vulcanization a molecular weight of at least about 18,000, by the Staudinger method.

12. The process of making high molecular weight rubbery copolymers having an iodine number of not more than 20, an average molecular weight about 30,000 and having substantially better stability against degradation by mechanical working, heat, light, and oxidation, than a polybutene of similar molecular weight, which comprises copolymerizing about 80 to 99% by weight of isobutylene, about .01 to 5% of styrene and about 0.1 to 15% of an unsaturated aliphatic hydrocarbon selected from the group consisting of a polyene of 4 to 8 carbon atoms and vinyl acetylene, in the presence of 1 to 5 volumes of inert solvent per volume of mixed reactants, at a temperature below −50° C., in the presence of a catalyst selected from the group consisting of a Friedel-Crafts catalyst dissolved in a lower alkyl halide of 1 to 2 carbon atoms and a Friedel-Crafts catalyst promoted by a small amount of an ether, hydrolyzing and removing the catalyst and evaporating the solvent.

WILLIAM J. SPARKS.
DAVID W. YOUNG.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,274,749 | Smyers | Mar. 3, 1942 |
| 2,368,538 | Gleason | Jan. 30, 1945 |
| 2,373,706 | Ott | Apr. 17, 1945 |
| 2,446,536 | Hardy | Aug. 10, 1948 |
| 2,479,450 | Young | Aug. 16, 1949 |

FOREIGN PATENTS

| Number | Country | Date |
|---|---|---|
| 513,521 | Great Britain | Oct. 16, 1939 |